March 30, 1954  R. M. GOODWIN  2,673,391
ARMATURE ASSEMBLING MACHINE
Filed Sept. 12, 1947  13 Sheets-Sheet 1

INVENTOR.
Richard M. Goodwin
by Ormond Hardman
and Fisher
his attorneys

March 30, 1954   R. M. GOODWIN   2,673,391
ARMATURE ASSEMBLING MACHINE
Filed Sept. 12, 1947   13 Sheets-Sheet 3

INVENTOR.
Richard M. Goodwin
BY
Spencer Hardman
and Fehr
his attorneys

March 30, 1954

R. M. GOODWIN 2,673,391

ARMATURE ASSEMBLING MACHINE

Filed Sept. 12, 1947

INVENTOR.
Richard M. Goodwin
BY Spencer Hardman & Fehr
his attorneys

March 30, 1954   R. M. GOODWIN   2,673,391
ARMATURE ASSEMBLING MACHINE
Filed Sept. 12, 1947                                                13 Sheets-Sheet 5

INVENTOR.
Richard M. Goodwin
BY
Spencer Hardman & Fehr
his attorneys

March 30, 1954 R. M. GOODWIN 2,673,391
ARMATURE ASSEMBLING MACHINE
Filed Sept. 12, 1947 13 Sheets-Sheet 7
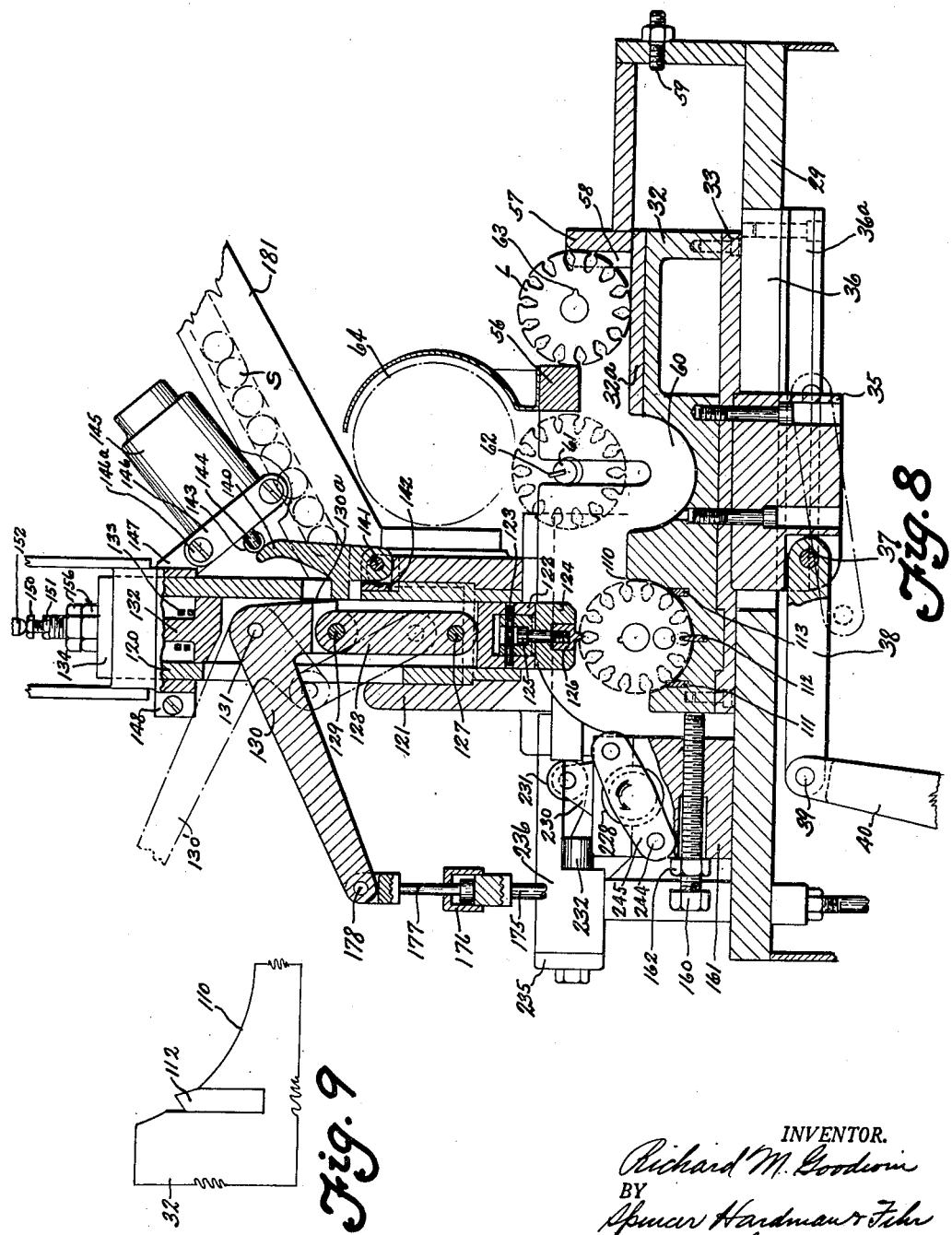
INVENTOR.
Richard M. Goodwin
BY
Spencer Hardman & Fehr
his attorneys March 30, 1954  R. M. GOODWIN  2,673,391
ARMATURE ASSEMBLING MACHINE
Filed Sept. 12, 1947  13 Sheets-Sheet 8

INVENTOR.
Richard M. Goodwin
BY Spencer Hardman & Fehr
his attorney

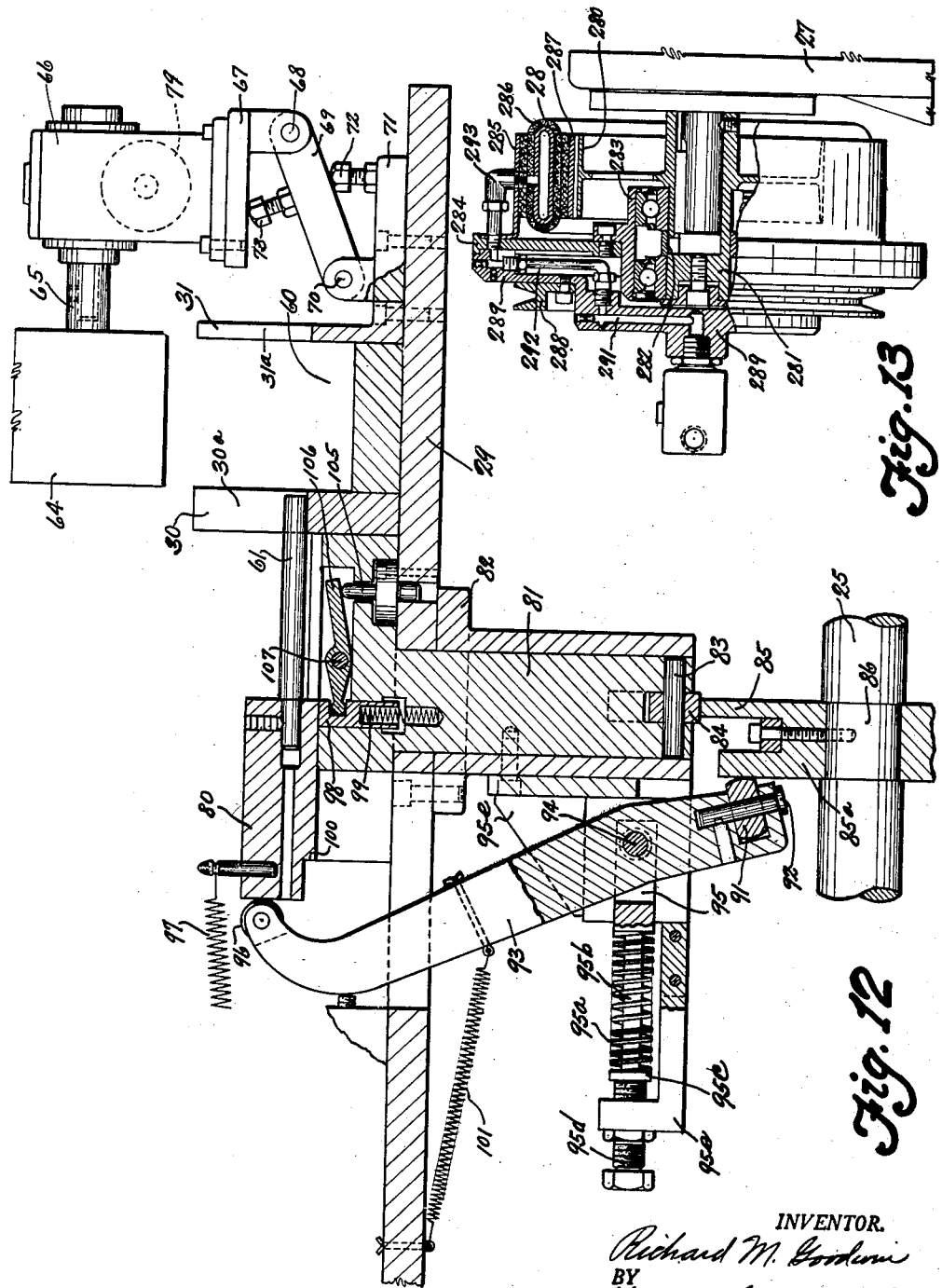

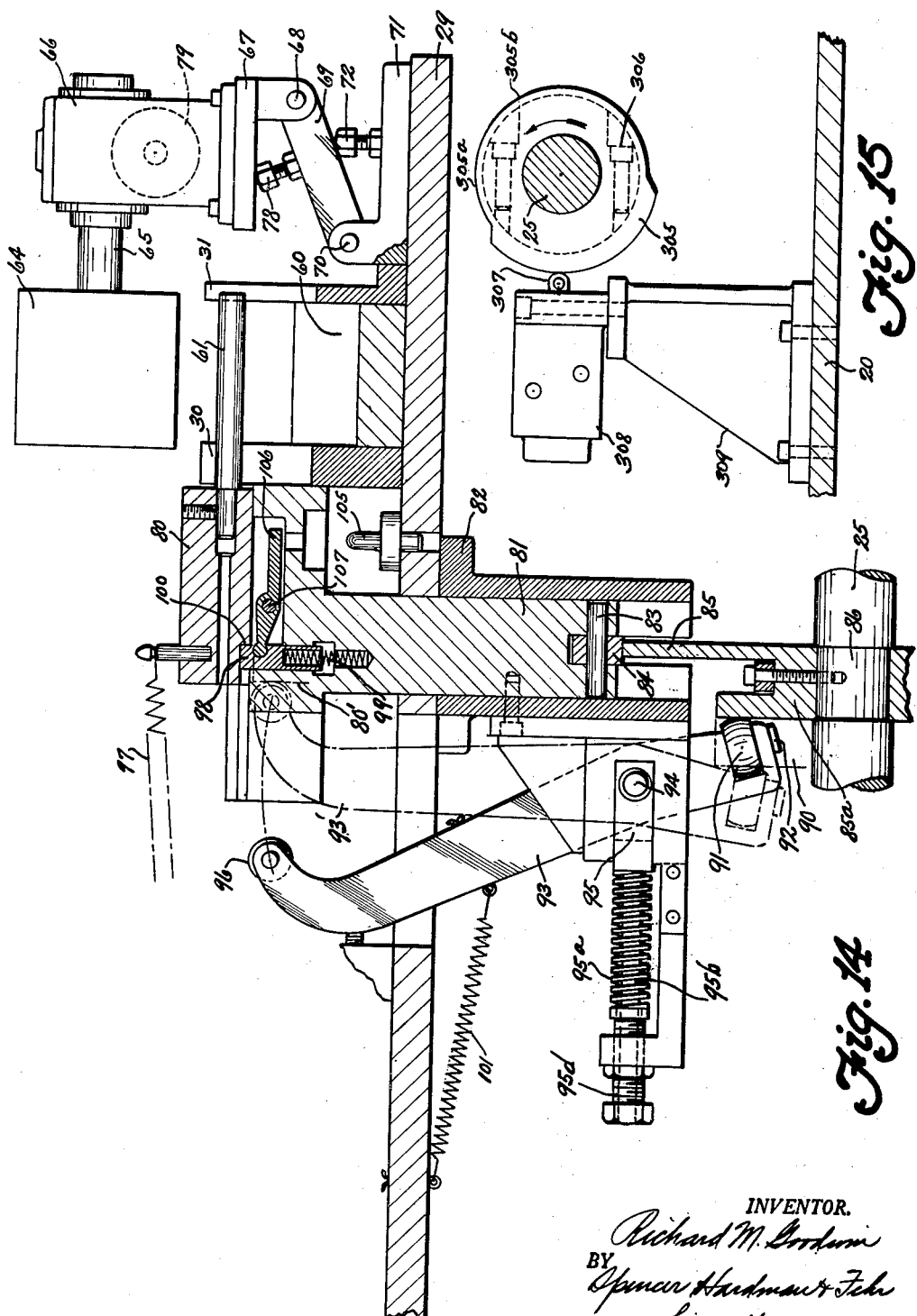

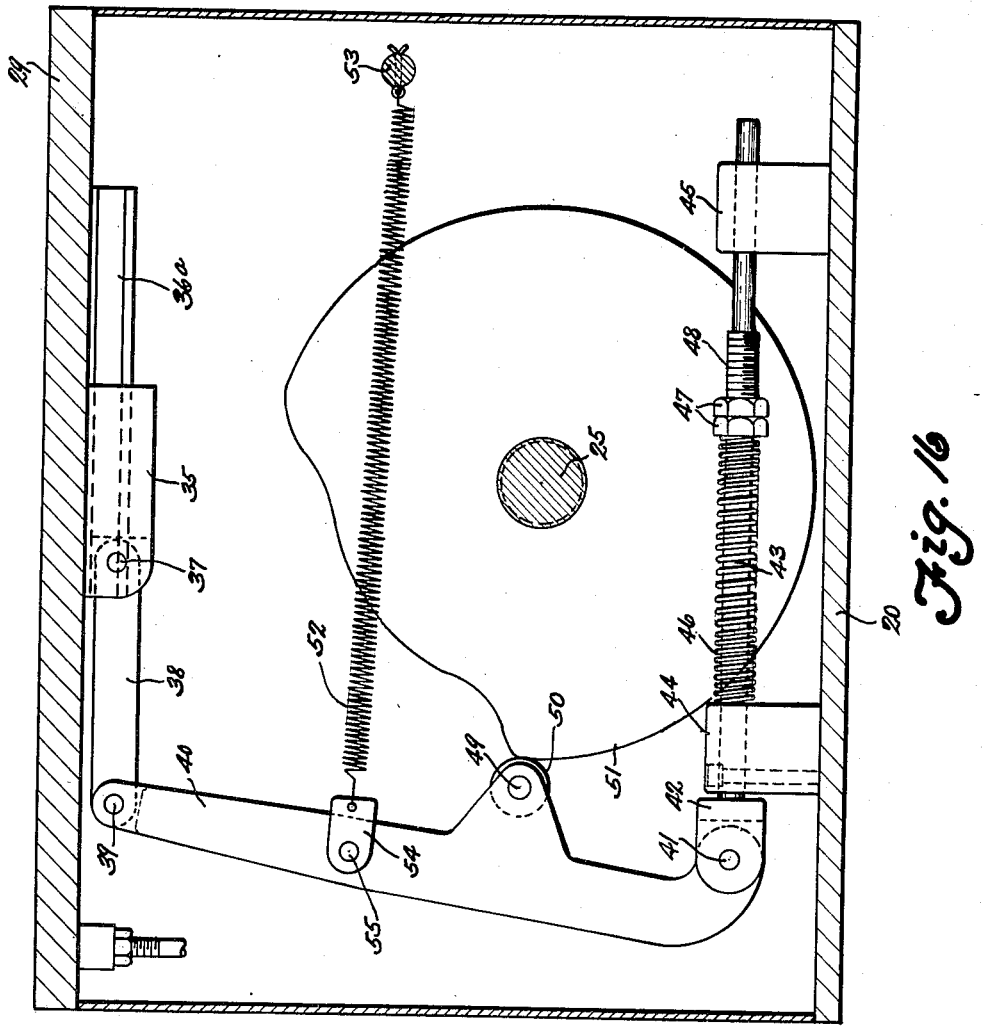

March 30, 1954  R. M. GOODWIN  2,673,391
ARMATURE ASSEMBLING MACHINE
Filed Sept. 12, 1947  13 Sheets-Sheet 13

INVENTOR.
Richard M. Goodwin
BY Spencer Hardman Fehr
his attorney

Patented Mar. 30, 1954

2,673,391

UNITED STATES PATENT OFFICE 2,673,391

ARMATURE ASSEMBLING MACHINE

Richard M. Goodwin, Anderson, Ind., assignor to General Motors Corporation, Detroit, Mich., a corporation of Delaware Application September 12, 1947, Serial No. 773,665

3 Claims. (Cl. 29—205)

This invention relates to the manufacture of armatures for dynamoelectric machines and its object is to provide a machine for assembling core laminations with an armature shaft and for burnishing the edges of the core teeth.

Further objects and advantages of the present invention will be apparent from the following description, reference being had to the accompanying drawings wherein a preferred embodiment of the present invention is clearly shown.

In the drawings:

Fig. 8 is a sectional view on line 8—8 of Fig. 2.

Fig. 9 is a fragmentary detail of a locator shown in Fig. 8.

Fig. 12 is a sectional view on line 12—12 of Fig. 2.

Fig. 13 is a sectional view on line 13—13 of Fig. 2.

Fig. 14 is a sectional view on line 12—12 of Fig. 2 showing parts in positions other than shown in Fig. 12.

Fig. 15 is a sectional view on line 15—15 of Fig. 5.

Fig. 16 is a sectional view on line 16—16 of Fig. 5.

Figure 2:
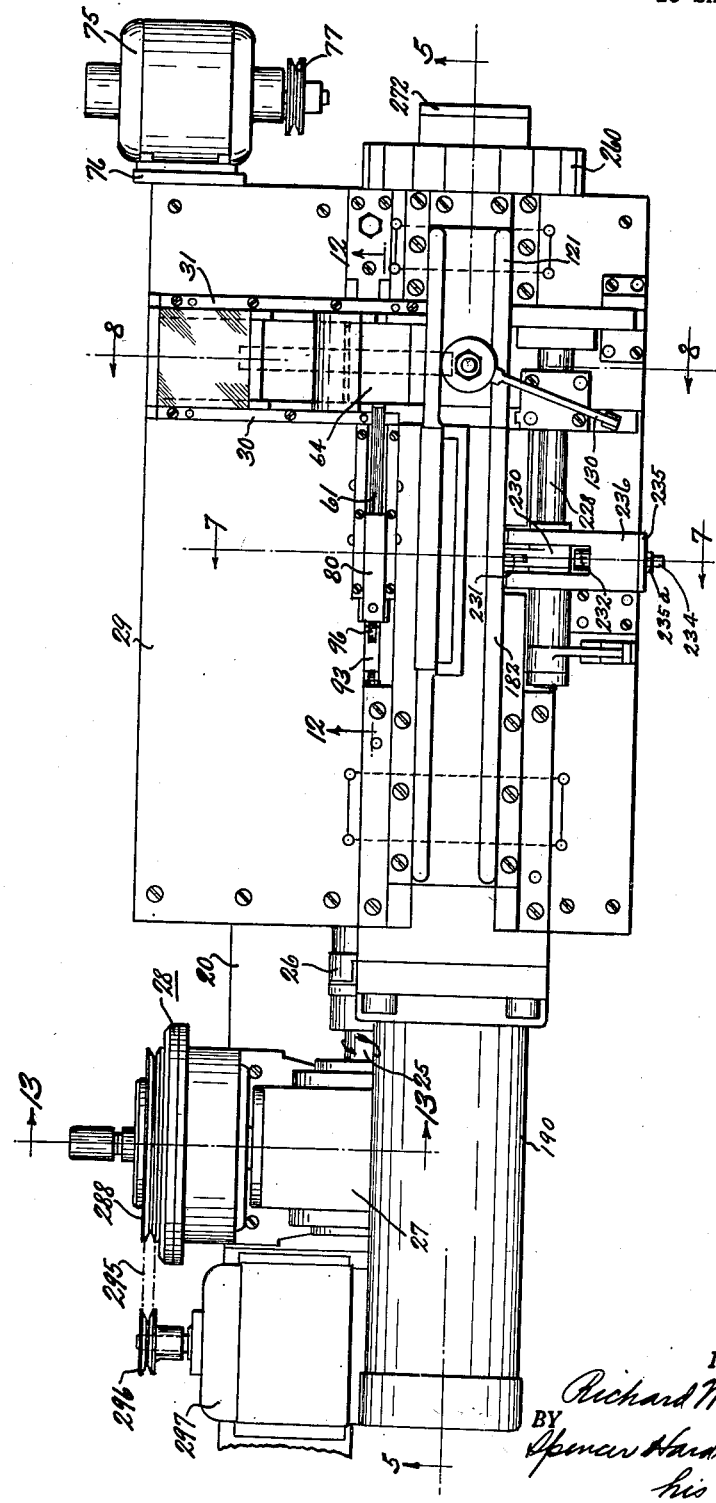
Fig. 2 is a plan view.
Figure 3:
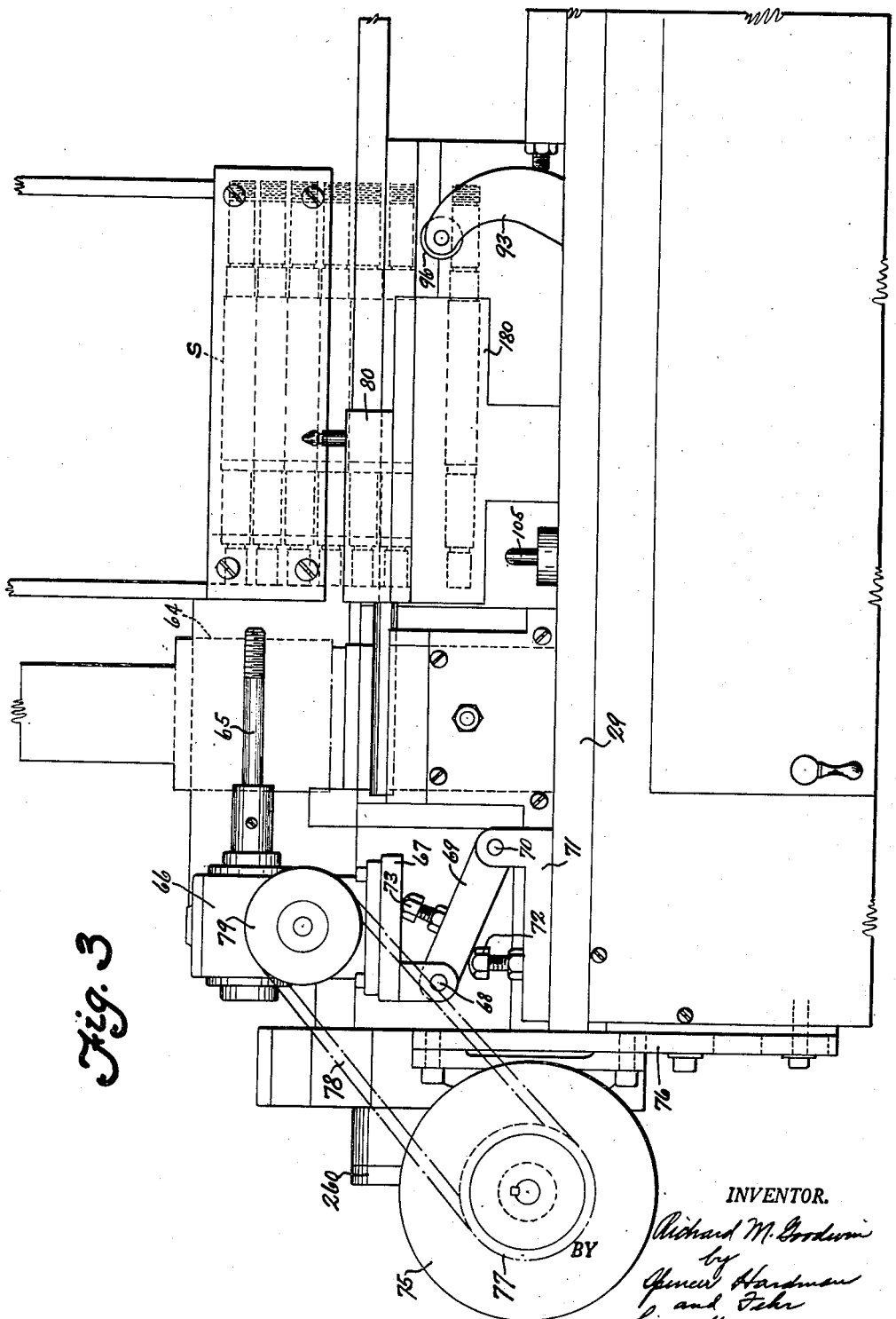
Fig. 3 is a rear view.

A base 20 (Fig. 5) supports frames 21 and 22 carrying bearings 23 and 24 for a shaft 25 connected by a coupling 26 with a speed reducer 27 driven by a motor driven clutch 28 (Fig. 13). The frames 21 and 22 support a table 29. The table supports plates 30 and 31 (Fig. 2) which guide a carriage or shuttle 32 (Fig. 8) attached to a bearing plate 33 which slides on the table. The shuttle is attached to a block 35 which moves in an opening 36 in table 29 and is guided by ways 36a attached to the table. Block 35 is connected by pin 37 with a link 38 connected by a pin 39 with a lever 40 connected by a pin 41 (Fig. 16) with a clevis 42 provided by a rod 43 slidably supported by lugs 44 and 45 supported by the base 20. The rod 43 is urged right by a spring 46 pushing against nuts 47 threaded on screw portion 48 of the rod 43. Lever 40 carries a pin 49 pivotally supporting a roller 50 engaging a cam 51. A spring 52, attached to a fixed stud 53 and to a plate 54 which a pin 55 connects with lever 40, urges the roller 50 against the cam 51. Rotation of the cam 51 produces movement of the shuttle 32.

Shuttle 32 carries a wear plate 32a upon which a stack of laminations L is placed when the carriage is in the position shown in Fig. 8. Lamination discs L are confined between a bar 56 and a bar 57 having a notch 58 which receives the discs. When shuttle 32 is moved against the back stop screw 59, the discs drop into a pocket 60 of the shuttle. When the shuttle is moved forward (left in Fig. 8), the discs are located for operation by a device which causes them to be aligned. This device includes an aligning arbor or rod 61 smaller in diameter than the hole in the discs and having a key 62 which, when the discs are turned will engage the notch 63 of each disc and stop its rotation. The rod 61 enters the holes in the discs when they are in the pocket 60 and lifts them into contact with a rotary wire brush 64 mounted on a shaft 65 connected by gearing in a box 66. A motor 75 mounted on a fixed plate 76 drives a pulley 77 connected by a belt 78 with a pulley 79 which drives the gearing in box 66. Gear box 66 is supported by a pad 67 connected by pin 68 with a link 69 connected by a pin 70 with a bracket 71 supported by table 29. The elevation of brush 64 is adjusted by turning a screw 72 threaded into bracket 71 and engaging link 69, and by turning a screw 73 threaded into link 69 and engaging the pad 67.

The disc aligning rod (Fig. 12) is carried by a slide 80 guided for horizontal movement by and carried by a frame 81 guided for vertical movement by a bracket 82 supported by table 29. Frame 81 carries a pin 83 supporting a roller 84 which engages a cam 85 made in two pieces 85a and 85b (Fig. 7) which are clamped into the annular groove 86 in shaft 25 which drives the cam. Cam 85 produces vertical movements of rod 61. Movement of rod 61 to the right is effected by a cam 90 integral with 85a which engages a roller 91 which a pin 92 pivotally connects with a lever 93 pivoted on a pin 94 supported by a block 95. Lever 93 carries a roller 96 at its upper end for engaging the slide 80 to move it (while lowered) from the position shown in Fig. 12 to the position 80' in Fig. 14. The rod 61 is moved only horizontally by cam 90 to the right from the position shown in Fig. 12, and passes through notches 39a and 31a in plates 30 and 31 and through the holes in the lamination discs. In case right movement of the rod 61 were obstructed by a misplaced lamination disc when cam 90 moves roller 91 left, block 95 can move left against the action of a spring 95a (Fig. 12) which surrounds a rod 95b extending through a washer 95c and into a hollow screw 95d threaded into a bracket 95e which is attached to part 82 and which provides a guide for horizontal movement of the block 89. When the slide 80 has been moved fully to the right against the action of spring 97 it is latched by a plunger 98 urged upwardly by a spring 99 so that it will contact a shoulder 100 of the slide. Then the lever 93 can return under the action of a spring 101 from the position 93' to the full line position shown in Fig. 12, while the slide 80 remains to the right of the position shown in Fig. 12. Then the rod 61 is elevated while it is located within the holes of the discs L by the operation of cam 85 which lifts the frame 81 from the position shown in Fig. 12 to that shown in Fig. 14 so as to cause the discs to be engaged by the wire brush 64. This engagement continues for a time sufficient for the discs L to become aligned by the engagement of their notches 63 with the key 62 (Fig. 8) on bar 61. After this lapse of this time, the cam 85 permits gravitation of the frame 81 to the position shown in Fig. 12. During this movement a pin 105 supported by table 29 is engaged by a lever 106 pivoted on a pin 107 carried by frame 81 thereby causing the lever 106 to move counterclockwise to move the plunger 98 down below the shoulder 100 of slide 80, whereupon the spring 97 returns the slide 80 to the position shown in Fig. 12 and the rod 61 is withdrawn from the discs L.

Before the rod 61 had descended with the discs L, the shuttle 32 had moved right from the position shown in Fig. 8, to locate the pocket 110 thereof underneath the wire brush 64, certain of their teeth will receive locating bars 111, 112 and 113 and alignment will be maintained after the bar 61 is withdrawn.

If the discs L are properly seated, the operation of forcing a shaft through them can be effected after the discs are clamped in position. To make sure that the shaft forcing mechanism to be described will not operate if the discs are not properly seated, a safety device is provided. A guide 120 supported by a frame 121 supports for vertical movement a slide 122 connected by a pin 123 with a block 124 which a screw 125 attaches to a toothed rib or clamping member 126 in alignment with locator 112. Pin 127 connects slide 122 with link 128 connected by a pin 129 with a bell crank lever 130 which pin 131 connects with a slide 132 also guided by guide 120. A spring 133 between the top of the slide 132 and the top end wall 134 of guide 120 resists certain upward movement of the slide 132.

Figures 10, 11:
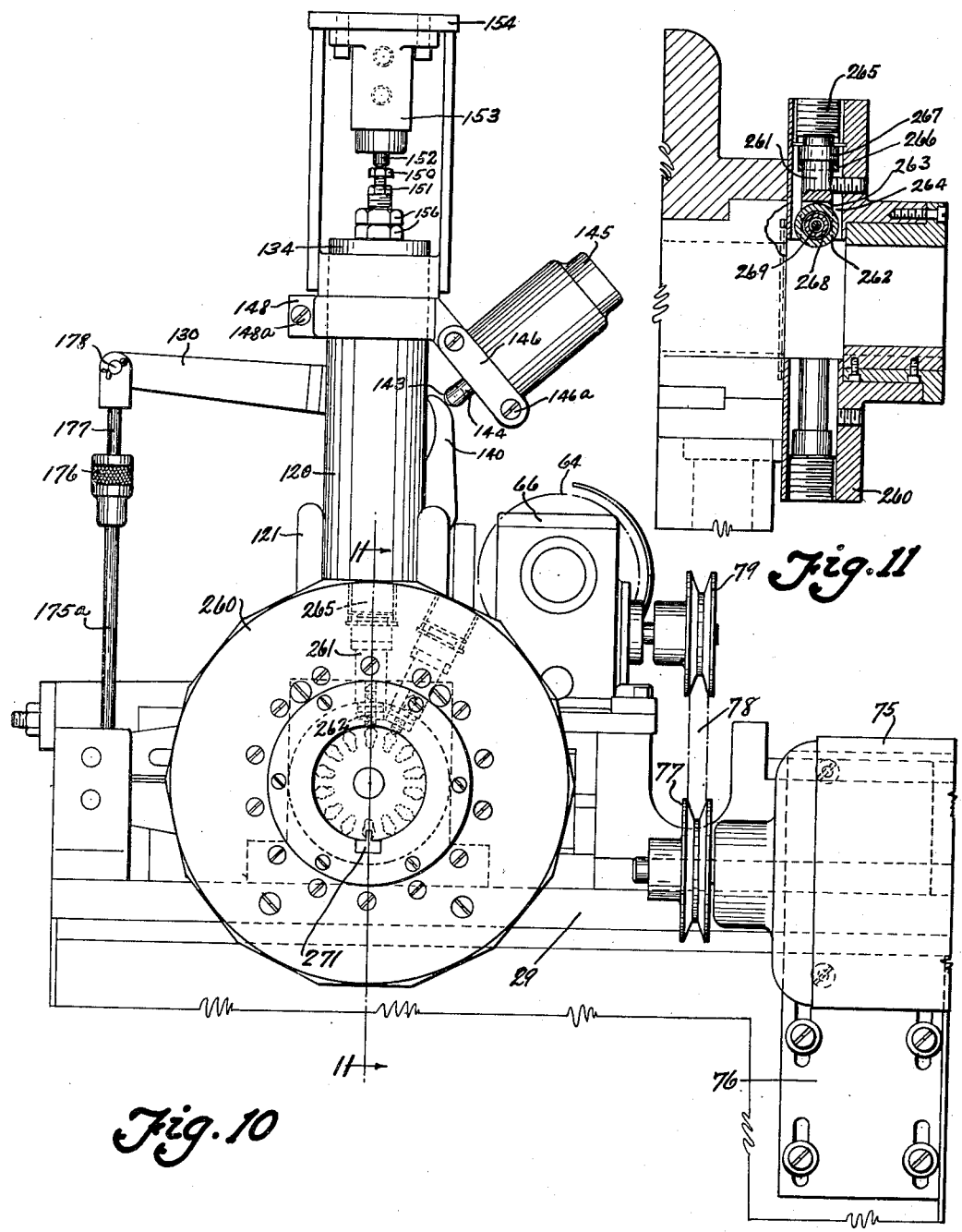
Fig. 10 is a fragmentary end view with the burnisher attached.
Fig. 11 is a sectional view on line 11—11 of Fig. 10.

If the discs L are properly seated, when the lever 130 moves from the position 130' (Fig. 8) to the lower position shown in full lines, the toggle link 128 is moved to a vertical position to cause the clamp tooth 126 to be received between adjacent teeth at the top of the discs L, and the lever 130 can cause its surface 130a to engage a lever 140 which a pin 141 supports on a bracket 142 attached to guide 120. If lever 130 can move into normal lower position it will cause lever 140 to engage a roller 143 on the end of a valve rod 144 to open a valve 145 which effects the operation of hydraulic means to be described for forcing a shaft through the discs L. If the discs L are not properly seated in pocket 110 and are not properly aligned, clamp tooth 126 either cannot enter a tooth space in discs L or it cannot move down to its normal lowest position. In either case, the pivot 131 of lever 130 will not be at its normal lowest position and lever 130 cannot place its surface 130a against lever 140 so as to cause it to open valve 145 and the hydraulic means for forcing a shaft through the discs L cannot operate. Furthermore, slide 132 will be forced up against the action of spring 133 and will cause a screw 150 (threaded into its upper end and locked in the desired position of adjustment by a nut 151) to engage the operating rod 152 of a valve 153 (Fig. 10) supported by a frame 154 having a clamping collar 148 by which a screw 148a secures the frame 154 to the guide 120. If the valve 153 is thus operated, clutch 28 to be described is disengaged. Collar 148 has a part 147 (Fig. 8) which, together with a bar 146 attached to part 147 by screws 146a, secures the valve 145 to the collar 148. The normal lower position of the slide 132 and parts suspended therefrom are adjusted by turning nuts 156 threadedly engaging the upper threaded end of slide 132 which passes through a hole in the upper end wall 134 of guide 120.

The location of aligning bar 112 in alignment with the tooth 126 is determined by adjusting the screw 160 threaded through a block 161 and locked in adjusted position by a nut 162. If carriage 32 strikes screw 160 before cam 51 (Fig. 16) ceases pushing lever 40 to the left, lever fulcrum pin 41 can move left against the force of spring 46.

The feeler tooth 126 is moved vertically by a cam 170 (Fig. 4) driven by shaft 25 and engaging a roller 171 pivotally supported by a lever 172 fulcrumed on a pin 173 supported by a block 174 supported by base 20. Lever 172 is connected by pin 175 with a rod 175a connected by a detachable coupling 176 with a rod 177 connected by pin 178 with lever 130. Lever 130 is urged up into the position shown in Fig. 4 by a spring 179 connecting lever 172 with table 29.

Chutes 180 and 181 (Figs. 1-5-7-8) support armature shafts S and guide them into a slot in frame 121 and in a slide 182. The lowermost shaft S rests on a plate 183 which may be a part of the frame 121. When the slide moves left, a shaft drops through slot in the plate 183 and upon pairs of rollers 184, journalled on pins 185 supported by plate 183 and blocks 186. A shaft which has dropped is marked S' in Figs. 7 and 5. At the proper time, pressure fluid is admitted to the left end of a cylinder 190 to cause its piston rod 191 to move right and move a plunger 192 attached thereto. A bore 193 in the plunger 192 receives the reduced left end of shaft S' and the plunger engages the shoulder 194 of the shaft S' and pushes it through a hole in a pressure pad 195 (urged left by springs 195a and guided by a ring 196 (Fig. 6) which is supported by the frame 121) and through the holes in the discs L then in the pocket 110 and clamped against the locators 111, 112, 113 by the toothed clamp jaw 126 (Fig. 8). Motion of the discs L to the right is resisted by two back up plates or jams 200, 201 while the shaft S', which is straight-knurled, is pressed through the holes in the discs L. Later the jaws 200, 201 are moved laterally out of the path of movement so that a pusher device to be described can move the assembled shaft and core discs into a chamber with a sleeve 202 located within an outer sleeve 203 retained by the frame 121 and receiving pressure from the plates 200, 201.

Figures 5, 6:
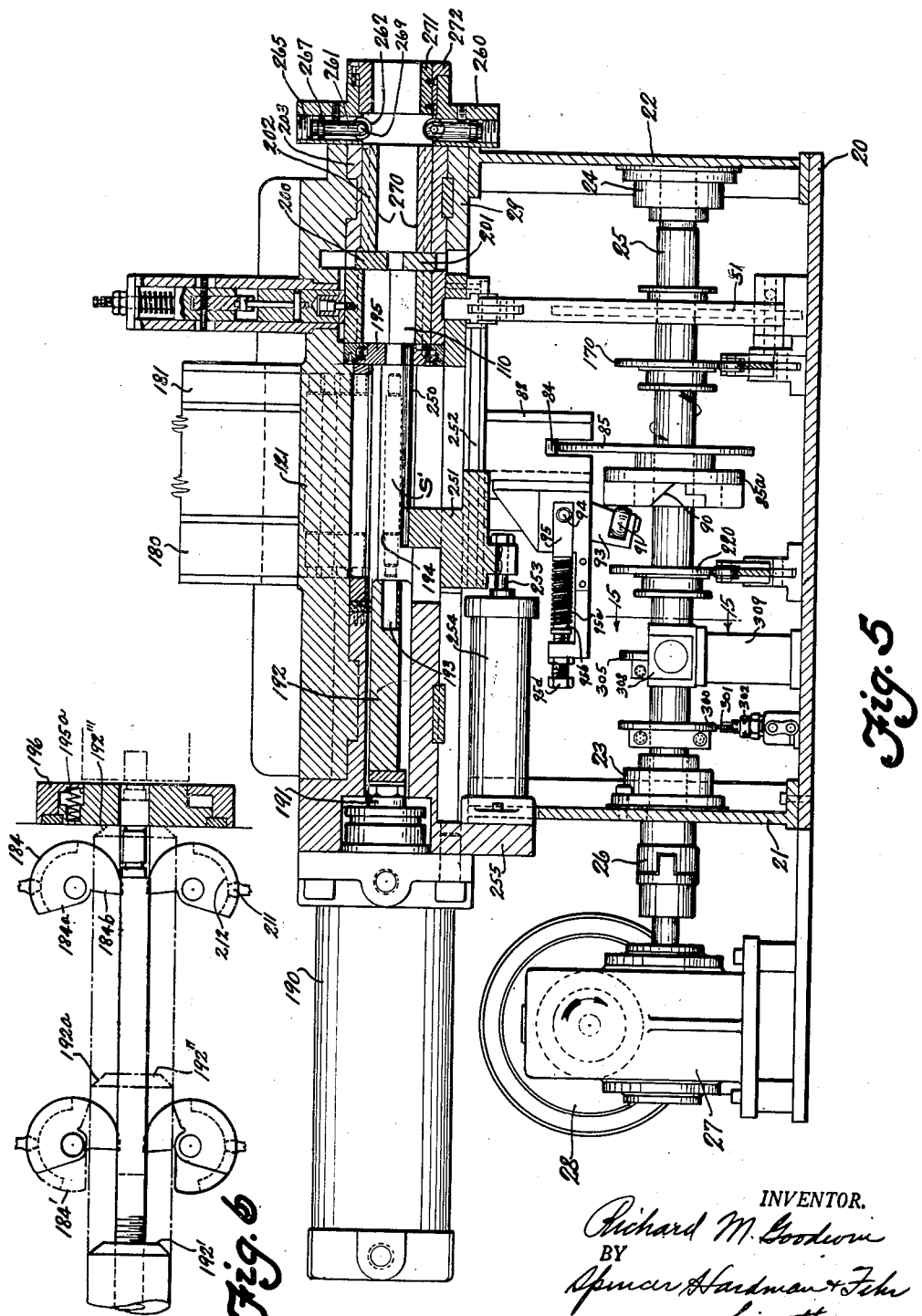
Fig. 5 is a sectional view on line 5—5 of Fig. 2.
Fig. 6 is a fragmentary view on line 6—6 of Fig 6.
Figure 7:
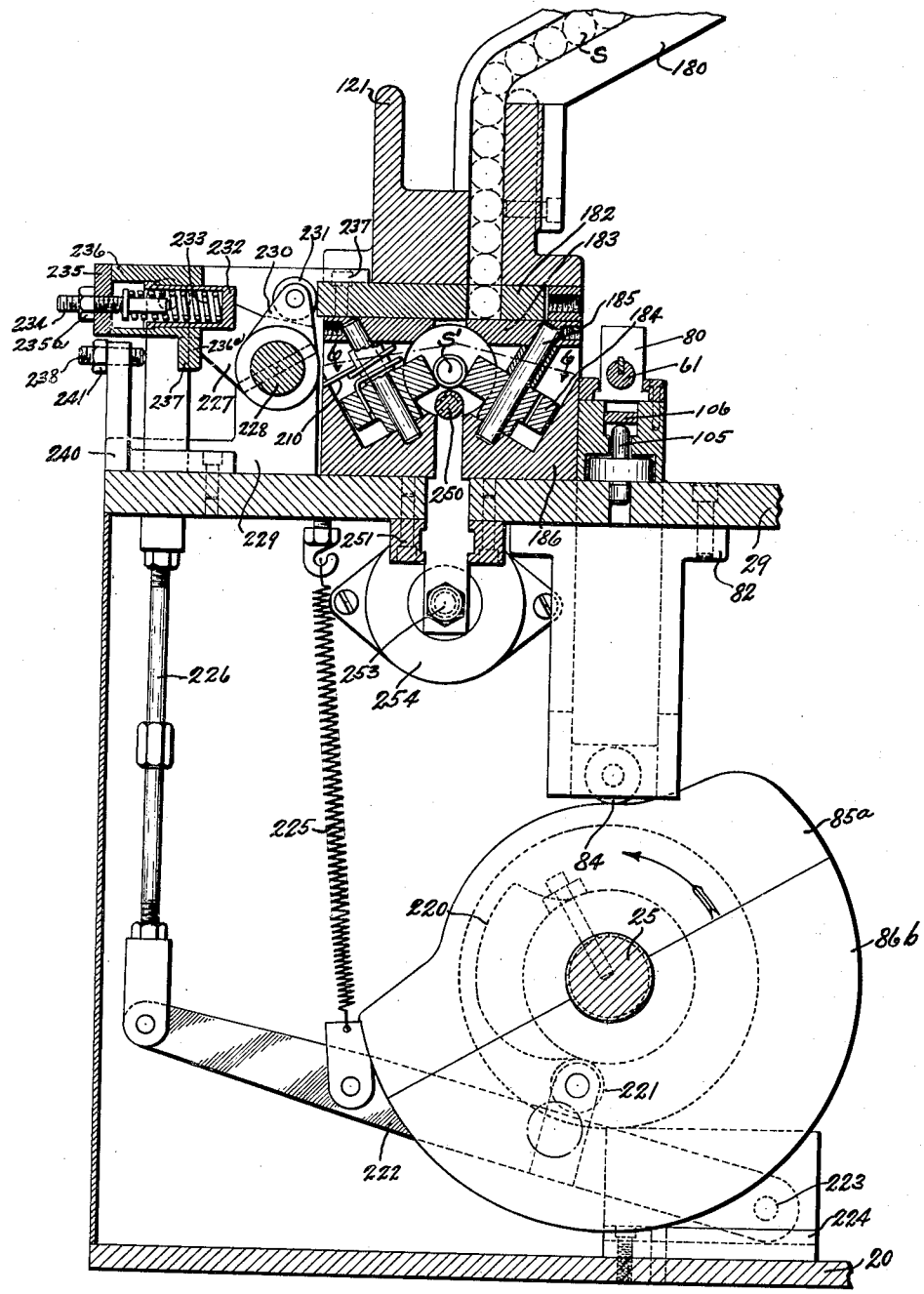
Fig. 7 is a sectional view on line 7—7 of Fig. 2.

The rollers 184 provide in effect V-grooved supports for the shaft S' to guide it into the holes in the core discs as the plunger or ram 192 moves right or toward the observer in Fig. 7. Apparently in Fig. 7, the rollers 184 are located in the path of movement of the ram 192. To permit movement of the ram 192, the rollers are cut away at 184a and 184b (Fig. 6). The right end of the ram 192 is beveled at 192a and this end engages the roller surfaces 184b to cause the rollers to turn to position 184' which permits the ram 192 to pass by. Various positions of the ram are marked 192', 192'' and 192''' in Fig. 6. Fig. 6 is somewhat diagrammatic since it shows the shaft S' supported only by a thin edge of the rollers 184. Actually the shaft S' is supported by these rollers in the manner shown in Fig. 7.

When the ram 192 is moved left by the admission of pressure fluid to the right end of ram cylinder 190, the rollers are returned to full line positions 184 by torsion springs 210 (Fig. 7) which rotate the rollers until fixed stops 211 (Fig. 6) are struck by the end walls of arcuate grooves 212 of rollers 184 which receive these stops.

The shaft feed slide 182 is moved by a cam 220 (Fig. 7) driven by shaft 25 and engaging a roller 221 pivotally supported by a lever 222 fulcrumed at 223 on a block 224 supported by the base 20 and urged upwardly by a spring 225. Lever 222 is connected by adjustable link 226 pivotally connected with a lever 227 attached to a shaft 228 journalled in a bracket 229 supported by table 29. Shaft 228 carries a lever 230 pivotally supporting a roller 231 for engaging the slide 182 to force it right. Movement of the slide 182 left is effected by engagement of roller 231 with a plunger 232 which pushes a spring 233 against a shoulder on a screw 234, threaded through a bar 235 and locked by a nut 235a, the bar being attached to a bracket 236 which screws 237 attached to the slide 182. A lug 236a of the bracket is stopped by a screw 238 threaded through a bracket 240 and locked by a nut 241. After the slide 182 is stopped in its left movement, spring 233 is additionally compressed. There is lost motion in the operative connection between the roller 231 and the slide 182 and the plunger 232 for the reason that shaft 228 performs another function requiring greater movement than the slide 182 requires.

Figure 4:
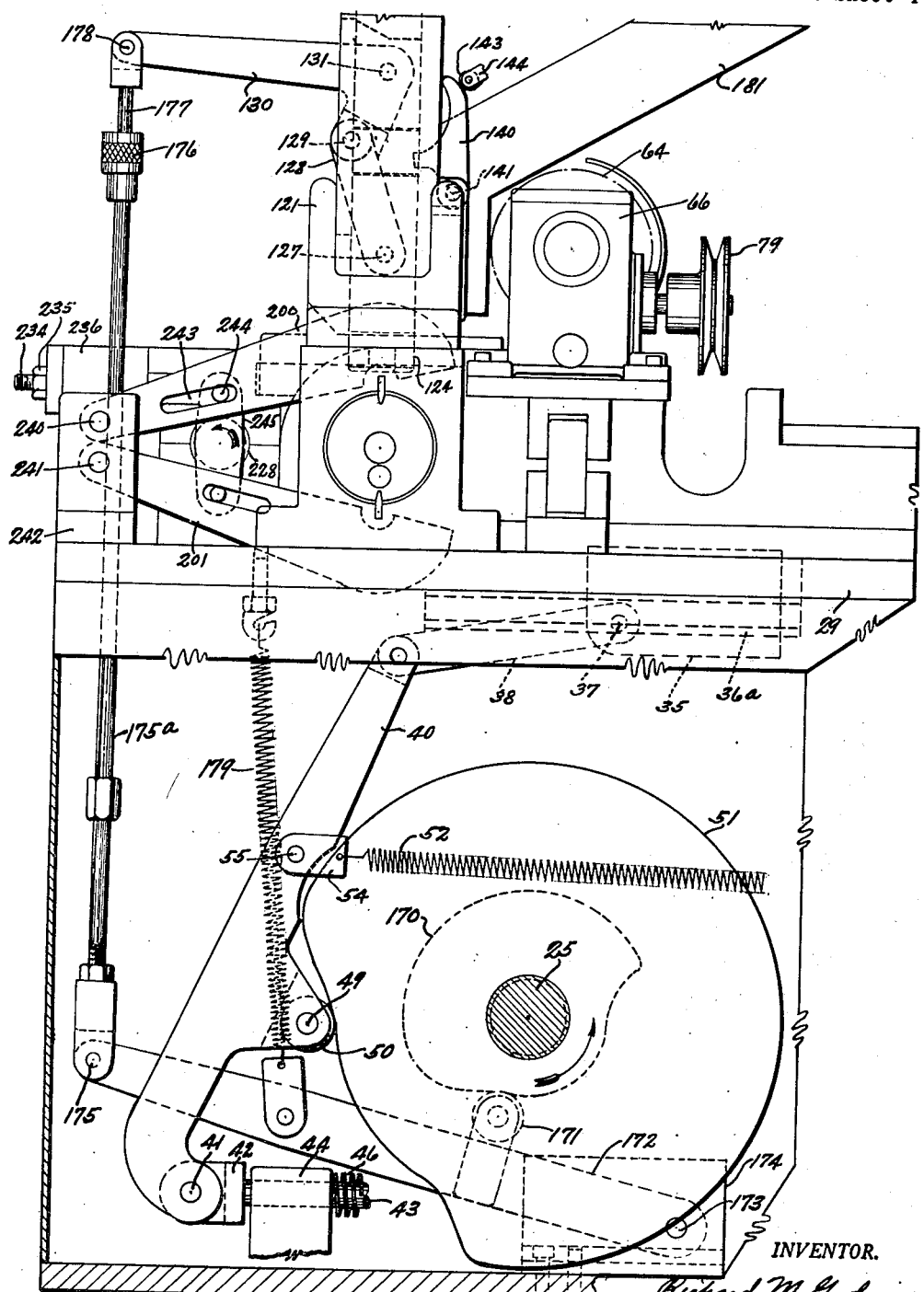
Fig. 4 is a fragmentary end view, partly in section, looking in the direction of arrow 4 of Fig. 1, the burnisher being omitted.

The second function performed by the shaft 228 is to operate the back up jaws 200 and 201 which, as shown in Fig. 4, are pivoted on pins 240 and 241 supported by a bracket 242. The plates 200, 201 have slots 243 receiving pins 244 carried by lever 245 attached to shaft 228 and moved by the shaft 228 between the positions shown in Figs. 4 and 8 corresponding to which these plates are retracted and advanced, respectively.

When the plates 200, 201 are retracted as shown in Fig. 4, the assembled core and armature shaft are moved from pocket 110 (Fig. 5) into the sleeve 202 by a pusher rod 250 which passes through a hole in pressure pad 195. Rod 250 is attached to a slide 251 guided for horizontal movement by ways 252 attached to table 29 and connected with a piston rod 253 connected with a piston in a compressed air cylinder 254 attached to a frame 255 which also supports oil cylinder 190. The core and shaft assembly which the rod 250 pushes into the sleeve 202 will be so located that the left end of the shaft will be located between or close to the right side of the back up jaws 200, 201. The next armature shaft S which is assembled by the ram 192 with core discs L in pocket 110, will engage the shaft of the preceding core and shaft assembly and push the latter through a core-tooth edge burnisher.

The burnisher comprises a plate 260 (Figs. 5 and 11) attached to the frame 121 and the table 29 and supporting radially disposed rods 261 each carrying a roller 262 received by a core slot and engaging the corner edges of the core teeth which define the slot in order to burnish the edges smooth. Each rod 261 has parallel flat 263 guided by ways 264 so that the rod cannot turn. Movement of each rod outwardly is limited by a screw 265; and movement inwardly is limited by engagement of a washer 266 with a shoulder 267 of the rod. Each roller 262 is journalled on a bearing 268 supported by a pin 269 attached to the rod. To prevent turning of the core when it is pushed from the locators 111, 112, 113 of pocket 110, the sleeve 202 is provided with locating ribs 270 (Fig. 5) which engage opposite core slots. Another locating rib 271 (Fig. 10) is provided by a sleeve 272 attached to plate 260. While a shaft is being forced into a core in pocket 110, a preceding shaft assembled with a core is pushed through the burnisher and drops upon a chute and descends to a bin. During movement of the assembly from pocket 110 to sleeve 202 by rod 250, the clamping jaw 126 is elevated slightly to relieve clamping pressure, but the tooth of jaw 126 remains slightly within the uppermost core tooth so that the core cannot turn as it is transferred from the pocket 110 to the sleeve 202.

Figure 1:
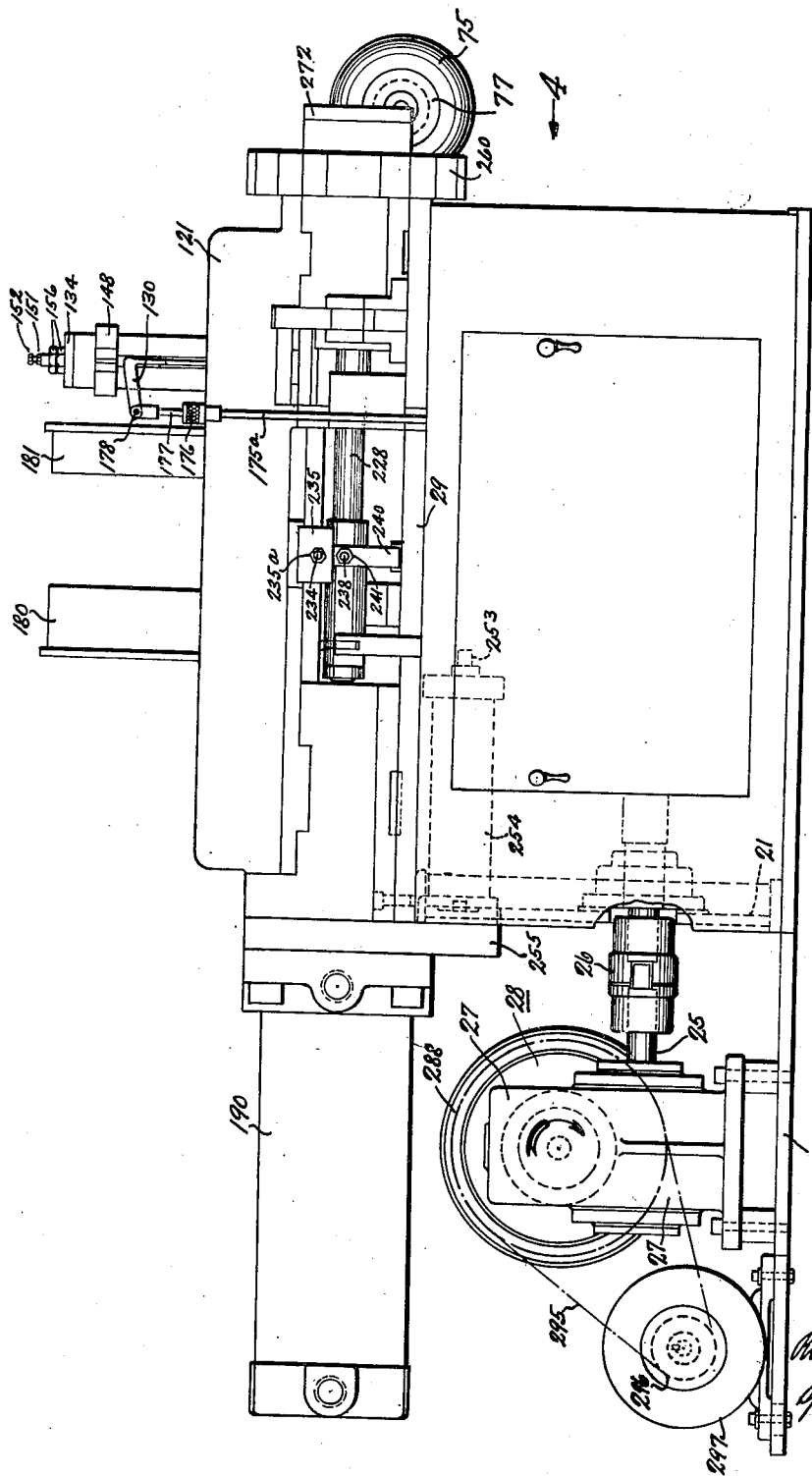
Fig. 1 is a front view of the machine.

Referring to Fig. 13, the shaft 27a of the speed reducer 27 supports the brake drum 280 of clutch 28 and the hub 281 of the drum supports roller bearings 282 supporting the hub 283 of a plate 284 carrying a cylinder 285 within which is located a pneumatic tube 286 which when receiving compressed air will squeeze a brake band 287 about the drum 280 thereby connecting a drive pulley 288 (attached to a disc 289 attached to plate 284) with the shaft 27a. Air is conducted from a block 290 (connected with an air compressor and, swivelly connected with plate 289) through ducts 291, 292 and 293 to the tube 286. Pulley 288 is connected by a belt 295 with a pulley 296 driven by an electric motor 297 mounted on base 20 (Fig. 1). Valve 153 (Fig. 10) controls the admission of air to the tube 286. Normally, valve 153 admits air, but in case its plunger 152 is lifted by the mechanism when a core is not properly seated in pocket 110 or a disc is not aligned, the tube 286 is disconnected from the air pressure source and is vented. Then the clutch 28 is disengaged.

Referring to Fig. 5, a cam 300 drawn by shaft 25 contacts a roller 301 on the plunger of valve 302 (mounted on base 20) which controls the flow of compressed air to the ends of pusher cylinder 254.

Figure 19:
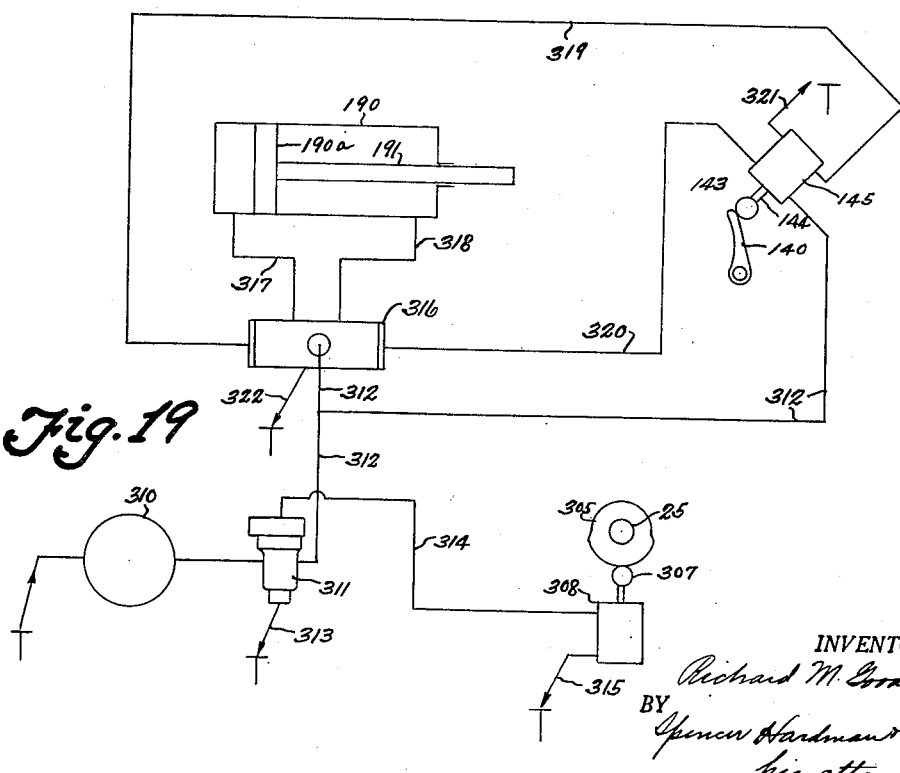
Fig. 19 is an hydraulic circuit diagram.

Referring to Fig. 15, a cam 305 made of pieces 305a and 305b clamped to shaft 25 by screws 306 engages the roller 307 on the plunger of a valve 308 supported by a bracket 309 mounted on base 20. Referring to Fig. 19, a motor driven pump 310 withdraws oil from a tank represented by letter T and forces it through a pressure control valve 311 which passes oil under a certain pressure to line 312 and the surplus is returned to tank as indicated by arrow 313. A pipe 314, which is connected through a by-pass in valve 311 with pump 310 is connected with valve 308 which is controlled by cam 305 in a manner such that, when operation of the piston 190a in ram cylinder 190 is not required, the pump 310 is unloaded by connecting its outlet through valve 308 to tank T as indicated by arrow 315. Pipe 315 is connected to the inlet of an hydraulic valve 316 whose distributing outlets are connected by pipes 317 and 318 with the ends of cylinder 190. The conditioning of valve 316 is controlled by pilot pistons therein whose movements are controlled by oil pressure in one or the other of pilot oil lines 319 and 320 which are connectible with line 312 by valve 145. When plunger 140 is down (lever 130, Fig. 8, being up) oil is passed by valve 145 to pilot line 320 and valve 316 is conditioned to pass oil from line 312 through pipe 318 to the right end of cylinder 190 to move the piston 190a left. When lever 130 moves down, and the core discs are properly aligned and seated, lever 140 moves the valve plunger up and valve 145 connects line 312 with pilot line 319 and connects line 320 with tank T as indicated by arrow 321. Valve 316 is conditioned for connecting line 312 with pipe 317 and the piston 190a moves right to push the ram 192 against the shaft S' then aligned with the core discs in pocket 110. When valve 316 connects line 312 with one end of cylinder 190, the other end is connected with tank T as indicated by arrow 322.

Figure 18:
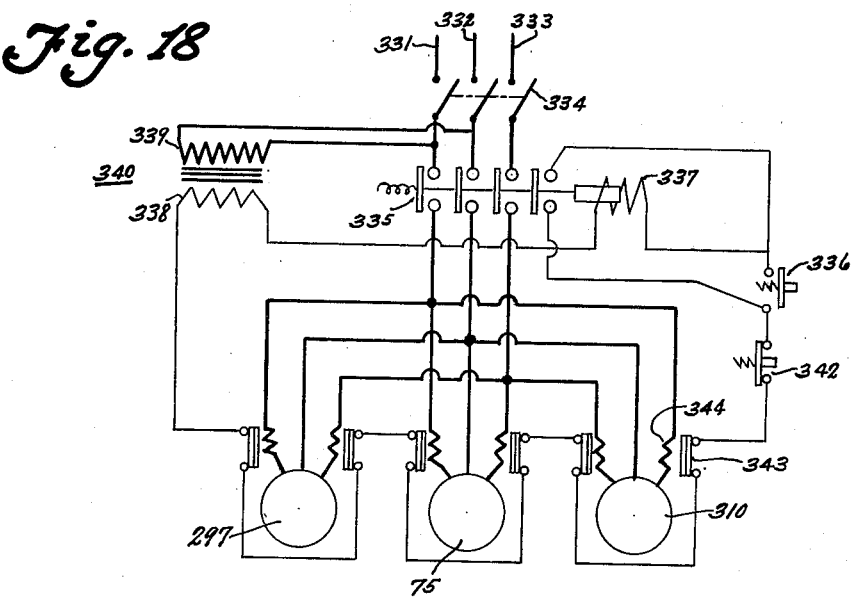
Fig. 18 is an electrical circuit diagram.

Fig. 18 shows the power circuit for the motors 297 (cam shaft), 75 (wire brush) and 310 (pump). A cam 220 or 440 volt A. C., 3-phase line 331, 332, 333 is connected by a manual switch 334 and a relay switch 335 with these motors. Relay switch 335 is closed by momentarily closing a switch 336 which causes the magnet coil 337 of switch 335 to receive current at 110 volts from secondary 338 of a transformer 340 whose primary 339 is connected to wires 331 and 332. De-energization of coil 337 and opening of relay switch 335 is effected either by opening switch 342 or by opening any one of thermal overload switches 343 connected in series and each having a thermal element heated by a heater element 344 in the circuit of a motor.

Figure 17:
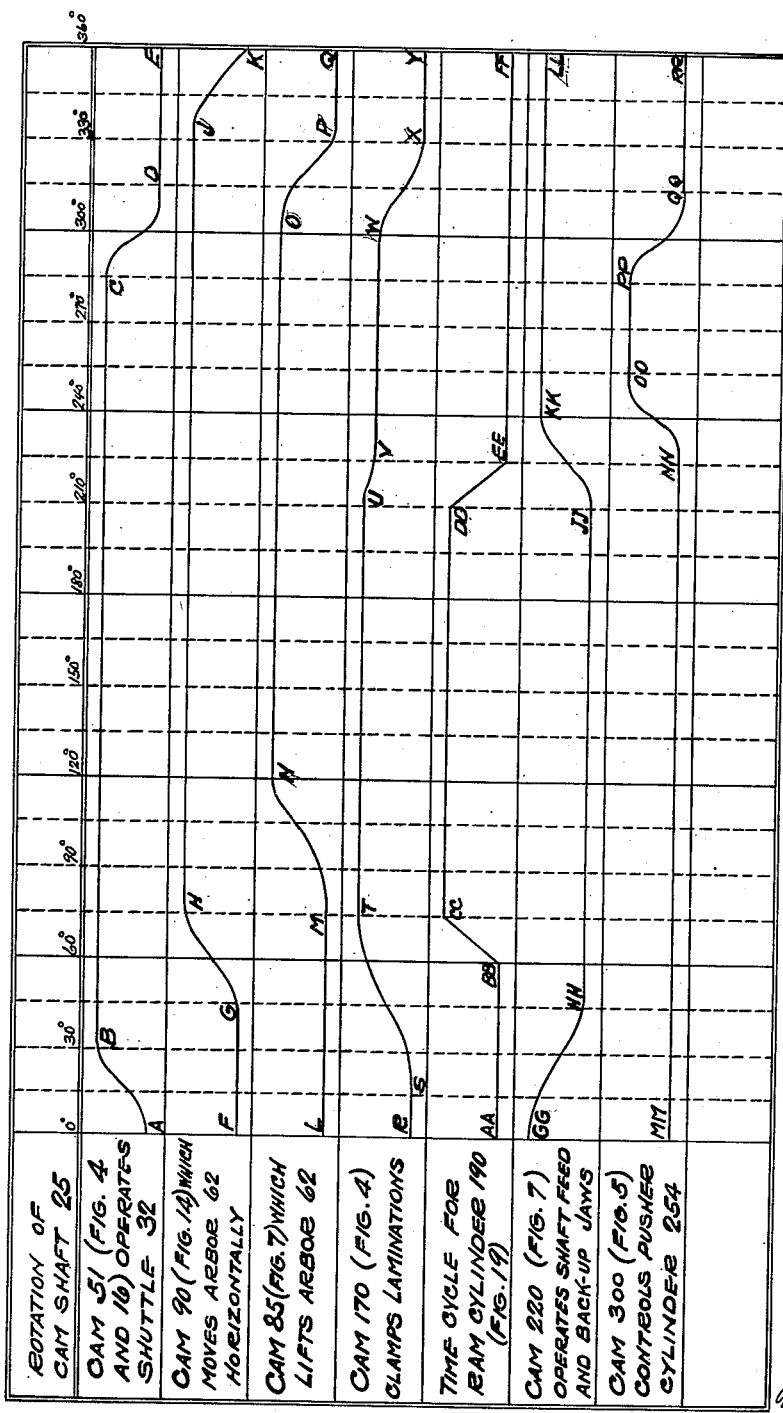
Fig 17 is an operation chart.

In Fig. 17 which shows functions for one cycle of operation during which the cam shaft 25 rotates 360°, lines A—B—C—D—E represent the function of cam 51. A to B shuttle 32 advances to position shown in Fig. 8; B to C shuttle remains advanced; C to D, shuttle is moved back to receive new load of discs L; D to E shuttle remains back.

Line F—G—H—J—K represents functions of cam 90 which moves aligning arbor 62 horizontally. F to G, arbor is retracted; G to H, arbor is advanced into discs L; H to J, arbor remains advanced; J to K, arbor is retracted.

Line L—M—N—O—P—Q represents functions of cam 85 which lifts arbor 62. L to M, arbor is down; M to N arbor moves up; N to O, arbor remains up while wire brush rotates lamination disc into alignment; O to P, arbor moves down; P to Q arbor remains down.

Line R—S—T—U—V—W—X—Y represents functions of cam 170 which causes the lamination to be clamped between locators 112, 113, 114 and 126. R to S clamping jaw 126 is fully retracted; S to T jaw 126 moves down to clamping position; T—U, laminations are clamped while an armature shaft is pressed into them, U to V clamping pressure is relieved to permit pushing the core from pocket 110 of shuttle 62, while rotation of the core is prevented since the locators still extend into core slots; V—W pressure remains relieved during the pushing referred to; W to X retract clamping jaw 126 completely; X to Y, jaw 126 remains fully retracted.

Line AA—BB—CC—DD—EE—FF represents the cycle of the ram cylinder 190. AA to BB, ram 192 is retracted; BB to CC, valves 145 and 316 (Fig. 19) operate to cause oil to flow into the left end of cylinder 190; CC to DD, ram 192 moves right; DD to EE, valves 145 and 316 operate to cause oil to flow into right end of cylinder 190; EE to FF, ram 192 moves left.

Line GG—HH—JJ—KK—LL represents functions of cam 220 which operates shaft feed slide 182 and back-up plates or jaws 200 and 201. GG to HH, feed shaft S' to work position and close jaws; HH to JJ, jaws remain closed while shaft S' is forced through lamination discs; JJ to K, jaws are opened and feed slide 182 moves back; KK to LL jaws remain retracted while assembled shaft and core are pushed out of pocket 110 into sleeve 202 preparatory to being pushed by the next right movement of ram 192 out through the burnisher.

Line MM—NN—OO—PP—QQ—RR represents the function of cam 300 which controls the pusher cylinder 254. MM to NN pusher rod 250 is in left position shown in Fig. 5; NN to OO, valve 302 is operated to cause compressed air to enter left end of cylinder 254; OO—PP rod 250 moves right to push core from shuttle pocket 110 into sleeve 202; PP—QQ, valve 302 is operated to cause compressed air to enter right end of cylinder 254; QQ to RR, rod 250 moves left.

While the embodiment of the present invention as herein disclosed, constitutes a preferred form, it is to be understood that other forms might be adopted, all coming within the scope of the claims which follow.

What is claimed is as follows:

1. A machine for assembling an armature core and a shaft wherein said core includes a plurality of discs each having a notched central opening and the shaft has a longitudinally extending key thereon, comprising in combination a reciprocable work holder having a forward and rearward end and adapted to reciprocate between forward and rearward positions on a slide, means for moving said work holder, a loading platform on the rearward end of said work holder, a first recess on the forward end of said work holder, a loading receptacle having a bottom portion thereof formed by said loading platform when the work holder is in a forward position wherein a plurality of misaligned discs may be positioned, an abutment portion for positioning said discs when said work holder is in the rearward position, a second recess spaced from and intermediate said first recess and said loading platform, said second recess on said work holder for aligning with said receptacle and receiving the discs contained therein when said discs are in engagement with said abutment and said work holder is in a rearward position, means for lifting said misaligned discs out of said second recess and other means cooperating with said first means for aligning said discs, said first means being operable and aligned with said second recess when said work holder is in a forward position and being adapted to hold said discs out of said second recess when the work holder is moved to the rearward position and to position said aligned discs in said first recess when said work holder is in a rearward position, means operatively associated with said first recess for holding said discs in alignment, and means for pushing said keyed shaft into the central openings of said aligned discs.

2. The combination set forth in claim 1 wherein the aligning means include a keyed rod having a diameter smaller than and insertable into the central openings of said discs and the second means is a rotating brush that is adapted to engage peripheral portions of said discs and rotate the discs on the rod when the discs are lifted from the second recess, whereby the notches on each of the discs are aligned with each other on the key of the rod.

3. The combination set forth in claim 1 wherein the holding means for holding the discs in the first recess of the work holder comprises fingers urged into clamping engagement with notches in the outer peripheral edges of the discs when said work holder is in its rearward position; a pair of backing clamps movable into engagement with the end disc clamped in said second recess for supporting the discs while the shaft is forced into the openings therein; and means for pushing the assembled rod and discs longitudinally out of the machine after the clamping fingers and backing clamp have been moved out of engagement with the discs.

RICHARD M. GOODWIN.

References Cited in the file of this patent

UNITED STATES PATENTS

| Number | Name | Date |
|---|---|---|
| 1,391,202 | Moore | Sept. 20, 1921 |
| 1,661,342 | Pabst | Mar. 6, 1928 |
| 1,679,865 | Konigsberg | Aug. 7, 1928 |
| 2,324,925 | Hallowell, Jr. | July 20, 1943 |
| 2,390,170 | Poole | Dec. 4, 1945 |
| 2,460,379 | Corren | Feb. 1, 1949 |